(12) United States Patent
Välikangas

(10) Patent No.: US 7,336,263 B2
(45) Date of Patent: Feb. 26, 2008

(54) METHOD AND APPARATUS FOR INTEGRATING A WIDE KEYBOARD IN A SMALL DEVICE

(75) Inventor: Jyrki Välikangas, Oulu (FI)

(73) Assignee: Nokia Corporation, Espoo (FI)

( * ) Notice: Subject to any disclaimer, the term of this patent is extended or adjusted under 35 U.S.C. 154(b) by 139 days.

(21) Appl. No.: 10/501,895

(22) PCT Filed: Jan. 17, 2003

(86) PCT No.: PCT/FI03/00033

§ 371 (c)(1),
(2), (4) Date: Feb. 16, 2005

(87) PCT Pub. No.: WO03/060682

PCT Pub. Date: Jul. 24, 2003

(65) Prior Publication Data

US 2005/0140660 A1    Jun. 30, 2005

(30) Foreign Application Priority Data

Jan. 18, 2002    (FI) .................................. 20020098

(51) Int. Cl.
G06T 11/00 (2006.01)
(52) U.S. Cl. .................................... 345/173
(58) Field of Classification Search ................. 345/173
See application file for complete search history.

(56) References Cited

U.S. PATENT DOCUMENTS

| | | | |
|---|---|---|---|
| 4,899,292 A | | 2/1990 | Montagna et al. |
| 5,615,384 A | * | 3/1997 | Allard et al. ................ 715/800 |
| 5,784,060 A | * | 7/1998 | Bertram et al. .............. 715/840 |
| 6,073,036 A | | 6/2000 | Heikkinen et al. |
| 6,211,856 B1 | | 4/2001 | Choi et al. |
| 6,597,345 B2 | * | 7/2003 | Hirshberg ................... 345/168 |
| 6,754,683 B1 | | 6/2004 | Park et al. |
| 2002/0011990 A1 | * | 1/2002 | Anwar ........................ 345/173 |
| 2006/0017711 A1 | * | 1/2006 | Pihlaja ........................ 345/173 |

FOREIGN PATENT DOCUMENTS

| | | |
|---|---|---|
| EP | 0 651 543 | 5/1995 |
| JP | 08221169 | 8/1996 |
| JP | 09091486 | 4/1997 |
| JP | 10049305 | 2/1998 |

* cited by examiner

Primary Examiner—Almis R. Jankus
(74) Attorney, Agent, or Firm—Alfred A. Fressola; Ware, Fessola, Van Der Sluys & Adolphson, LLP

(57) ABSTRACT

The invention relates to a method and an apparatus for using a wide keyboard including a wide range of keys in small mobile devices. A method relates to operating a mobile device having a touch sensitive display divided in input and output portions. A first location of a tactile input is detected on an input portion of the touch sensitive display displaying a plurality of keys. Next the input portion display view is zoomed by displaying and linearly magnifying the detected tactile input area and it's surrounding. A second location of a tactile input is detected and a key on the location of a second detected tactile input is highlighted. The highlighted key is activated and identified as an input.

31 Claims, 4 Drawing Sheets

METHOD AND APPARATUS FOR INTEGRATING A WIDE KEYBOARD IN A SMALL DEVICE

CROSS REFERENCE TO RELATED APPLICATIONS

This application is for entry into the U.S. national phase under §371 for International Application No. PCT/FI03/00033 having an international filing date of Jan. 17, 2003, and from which priority is claimed under all applicable sections of Title 35 of the U.S. Code including, but not limited to, Sections 120, 363 and 365(c), and which in turn claims priority under 35 USC §119 to Finnish patent application No. 20020098 filed on Jan. 18, 2002.

TECHNICAL FIELD

The invention relates to a method and an apparatus for using a wide keyboard including a wide range of keys in small mobile devices.

BACKGROUND OF THE INVENTION

Mobile devices like mobile telephones, personal digital assistants and game consoles have been planned small in size and light in weight to become handy and easy to keep with in any situation. One limiting feature in diminishing mobile devices is the usability of a keypad. The popularity of sms-messages (short message service) makes the easy and convenient use of a keypad even more important. Further there are many functions for example in wap (wireless application protocol) devices, which make it inevitable to have a wide range of keys available.

There are devices in the market, which combine a standard mobile phone with personal digital access (pda) features, like touch sensitive screens and larger keyboards. As important as the screen size and the graphical interface are, especially business users value also the capabilities of working with text, accessing menus and sending and receiving messages. Users do a lot of input manually with modern mobile phones. It is rather difficult to make a compromise between a small device and the keyboard big enough to be convenient to use.

In new wap-enabling, smart devices keymats are made bigger to achieve better usability. For example in the Communicator 9210 device manufactured by Nokia Corporation, Espoo, Finland there is a revised keyboard, which includes slightly bigger concave keys than earlier models of the Communicator series. "Communicator" is a registered trademark of Nokia Corporation. In so-called normal mobile phones there are many characters in one button, in order to reduce the actual number of buttons. In personal digital assistant devices, for example in those manufactured by Palm Inc., Santa Clara, Calif., USA, there have been introduced extra tools for writing. An extra tool can be for example a touch screen panel, which accepts a written input on a valid area of a screen panel. Also it is publicly known to input the data by activating drawn pushbuttons or graphical images. Typically this is done by positioning a cursor and activating a selected operation with the aid of a mouse, trackball, pen, wand, stylus, etc. The use of these auxiliary means requires a stable environment and situation.

In the publication EP 651543 there is introduced a personal communicator including a touch sensitive display. This mobile personal communicator includes a casing for a cellular phone, a modem and data processing system. On a touch sensitive display it is possible to choose a next operation by touching a drawn button on a display. Further by touching the screen it is possible to magnify graphical images, such as parts of a fax view and move the images around the display. In this publication the touch screen display comprises a pressure sensitive overlay on a liquid crystal display (LCD).

The publication U.S. Pat. No. 4,899,292 presents a computer coupled to a terminal having a resistive touch screen. As the former one, also this publication deals with images or image formatted data on a display, which are to be magnified. A tactile input is done with the aid of a wand on the touch sensitive screen. The screen detects a voltage signal, which is then converted into coordinates in known manner.

The publication U.S. Pat. No. 6,073,036 illustrates a mobile station with a touch sensitive input means and an automatic symbol magnification operation. A mobile station is provided with a touch sensitive input means, such as a touch sensitive display or a touchpad. The symbols or keys on a touch sensitive keypad can be implemented smaller in size, because the touched key is magnified so that it can be distinguished before selecting it as an input. The magnification is implemented as if there would be a convex lens in the middle of the user and the screen. So the illusion seen by the user is non-linear magnification of the original symbol(s) touched. Subsequent detection of the tactile input and its location can be used for further magnification or for selecting the symbol. In this solution the whole used keypad, which can include for example numbers, alphanumeric characters or special characters, is depicted at a time. The size of one symbol in the screen is dependent on the resolution of the screen. After the magnification, all symbols are still depicted. The pointed, selected one(s) is (are) magnified by the expense of diminishing all the others. The non-linear, lens-like magnification of selected symbol(s) causes the decreasing of the other, non-selected symbols done in proportion to their distance from the selected one(s).

SUMMARY OF THE INVENTION

The objective of the present invention is to implement a clear, well-designed and easily usable keyboard integrated in a small mobile device so that keys are distinguishable prior to selecting the input.

The objectives of the present invention are achieved so that a touch sensitive display provides a user interface and is used as an input and output means. Further the keys are zoomed in response to activation of the touch sensitive display to be clear and determinable.

The present invention is characterized in what is said in the independent claims. The advantageous embodiments of the present invention are presented in the pendent subordinate claims.

The present invention is built on a basic assumption that a touch screen is used both for input and output. Data is besides seen and achieved by the display, also inputted through it or at least in very close relationship with objects shown on the display. The diminishing of the device is established by picturing the keys on the touch sensitive display. The two-way, interactive display contains means for zooming display information so that a zooming function makes individual keys distinguishable. This makes even a small device usable and convenient. The advantage is that the input means, such as a keyboard, can be zoomed on a display so that selected area of the keyboard is magnified for a predetermined range. Therefore it is possible to use originally small keys in usable size. This makes it possible to manufacture a small, simulated keyboard. At the same time it provides comfortable, convenient use of the known keyboard, which most users already are familiar with, such as normal typewriter or computer keyboard with keys arranged to be at their typical places.

Typically there is a touch sensitive layer on the basic display, such as LCD. The touch sensitive display can be used for all manual input from choosing function keys to writing sins-messages and navigating in the net. The touch sensitive display expresses both the actual display for user to get the normal output and the keypad, keyboard or some functional keys for user to gain means for input. The input part of the display may vary in size, shape and content in different applications and in different modes of function. For example if the device is used for phoning, the input needs mainly numerical keys and further the function key, which establishes the connection. If the user wants to send an sins-message, the most needed keys include letters known from the typewriting or computer keyboards. Some often used functions can be activated from dedicated keys. Some rarely used, mode specific functions can be presented in the display and activated from the adjacent keys.

BRIEF DESCRIPTION OF THE DRAWINGS

In the following the present invention is introduced in more details with the accompanying figures, in which.

DETAILED DESCRIPTION

Figure 1:
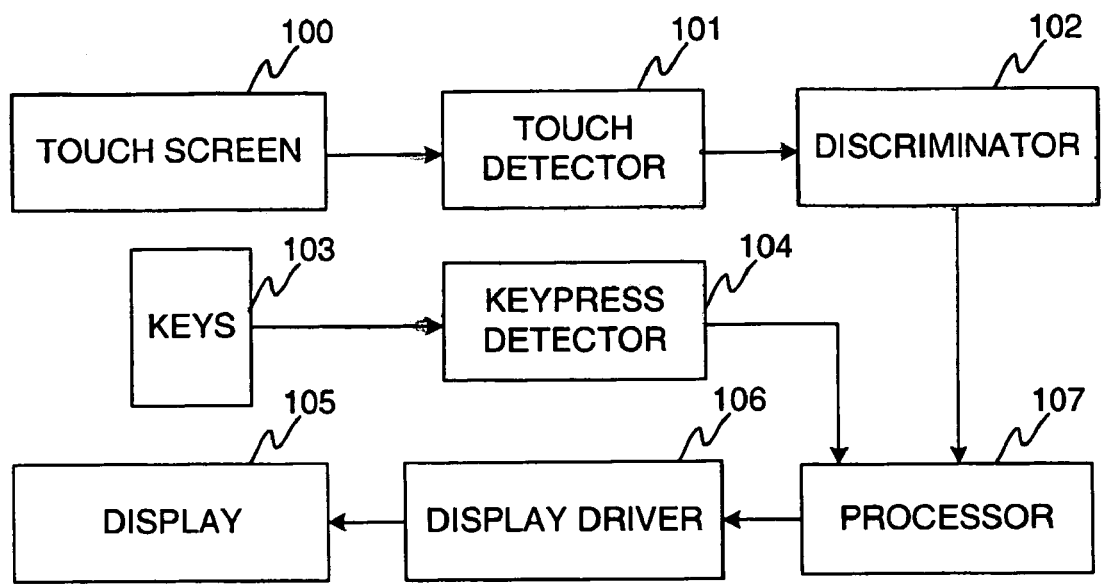
FIG. 1 illustrates an apparatus according to an advantageous embodiment of the present invention as a block diagram.

In the following description of the various embodiments reference is made to the accompanying drawings, which form a part hereof, and in which is shown by way of illustration various embodiments in which the invention may be practised. It is to be understood that other embodiments may be utilized, and structural and functional modifications may be made without departing from the scope of the present invention.

In the following description of the present invention a central part is a touch sensitive display. It is obvious that it is not essential to the present invention which type of touch sensitive panel is used. Further the means for touching the panel to indicate a tactile input can vary from a finger to any auxiliary input means. The touch screens are sensitive to touch and allow the user to interact with the device by touching items on the screen. A touch screen includes a touch screen panel, a controller and driver software. A touch screen panel is a transparent or translucent panel attached externally on the original display. The touch screen panel registers touch events and passes these signals to the controller. The controller then processes the signals and sends the data to the processor. Software drivers translate touch events for example into mouse—or key pressing events.

There are three types of touch screen technology: resistive, surface wave and capacitive. A resistive touch screen panel is coated with a thin metallic electrically conductive and resistive layer. In a resistive touch screen a change in the electrical current is registered as a touch event and the coordinates impressing its situation are sent to the controller for processing. Resistive touch screen panels are generally more affordable than other type of touch sensitive panels, but they offer only 75% clarity. Further the metallic surface layer is vulnerable and can be damaged by sharp objects. Resistive touch screen panels are not affected by outside elements such as dust or water.

Surface wave technology uses ultrasonic waves that pass over the touch screen panel. When the panel is touched, a portion of the wave is absorbed. This change in the ultrasonic waves registers the position of the touch event and sends this information to the controller for processing. Surface wave touch screen panels are the most advanced of the three types, but they can be damaged by outside elements. With this kind of touch screen panels it is important to differ real touches from background noise, etc.

A capacitive touch screen panel is coated with a material that stores electrical charges. When the panel is touched, a small amount of charge is drawn to the point of contact. Circuits located at each corner of the panel measure the charge and send the information to the controller for processing. Capacitive touch screen panels must be touched with a finger unlike resistive and surface wave panels that can use also other auxiliary means. Capacitive touch screens are not affected by outside elements and have high clarity.

The invention works well with all kinds of known touch screen types. It should be noted that independence of touch screen type means also that the invention can certainly take advantage of even future touch screen types that are not yet known at the priority date of this patent application. Especially if a certain touch screen type would inherently include the feature of producing an indication about the relative strength, i.e. pressing force of a touch, such an indication could most advantageously be used for the purposes of discrimination between touch types, which is described in more detail later.

FIG. 1 illustrates a block diagram of an apparatus used in an advantageous embodiment of the present invention. The block diagram shows only those display- and input-related functional blocks, which are important in implementing the present invention. It is obvious that the mobile device may include much more functional blocks, such as transceiver and receiver branches and memory units.

There is a display 105, which is typically a liquid crystal display (LCD), in FIG. 1. Overlaid on the display 105 there is a touch screen panel 100, which implements the physical interface for touch commands. Typically there is a backlight, on it a display and on it a touch sensitive overlay. This combination acts both as input and output device. There may also be some chosen dedicated or soft keys 103 as input means, but these are of little importance to the present invention.

A touch detector 101 winnows out the actual touches from other interfering factors. It depends on a type of a touch screen, how the actual touches are separated from fault detections. If the touch screen panel is a resistive one, the panel is not affected by outside elements, such as dust and water, and the activation of the input point on the panel can be done by finger or by some auxiliary instrument. The ultrasonic wave touch screen panels can be damaged by outside elements and are also sensitive for example to background noise. The touch screen panels employing capacitive technology are not affected by outside elements. The capacitive screens must be touched with a finger.

A processor 107 receives commands from a discriminator 102 (and a keypress detector 104, if dedicated or soft keys exist). A discriminator 102 discriminates between different touch commands in a predetermined way. It identifies for example that a quick touch acts for command 'select' and a long stable touch acts for 'zoom', moving touch means 'pan', etc. The different ways of input are identified and used for differentiating their functions. Advantageously the input is to be performed in a way users already are familiar with from a former use of keyboards. The discriminating of different inputs can be implemented for example so that a discriminator 102 is integrated in processor 107, which calculates time limits of touches or compares two detected, sequential locations of touches.

A keypress detector 104 detects key presses of the dedicated or soft keys 103 and conveys the detected information to a processor 107. A processor 107 initiates and executes various functions as commanded and it includes needed timers and other accomplishing units. The processor 107 issues display-relating commands to a display driver 106, which then converts display commands from processor 107 into driving signals for a display element 105. The display 105 implements the final conversion from electrical to visual form.

Figure 2:
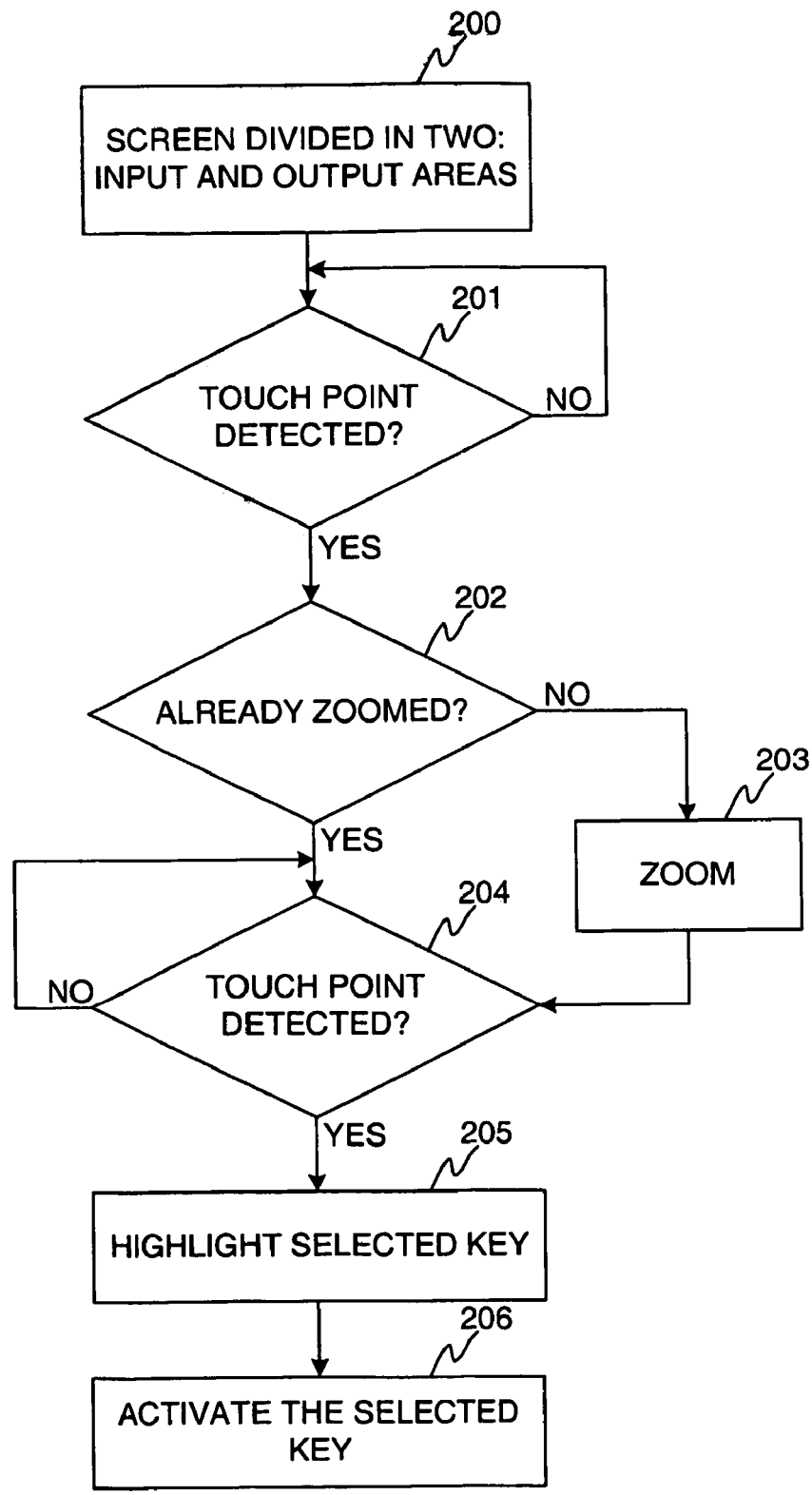
FIG. 2 illustrates a method according to an advantageous embodiment of the present invention as a flow diagram.

FIG. 2 shows a method according to an advantageous embodiment of the present invention. In this embodiment the zooming is done once and it is done always before the input is selected. This is implemented for example so that there is some predetermined time limit between steps, so that a constant tactile input first zooms and then activates a detected key. It is also common to select the input by releasing a touch. The checking of time limits is not shown in FIG 2.

At first the display unit or the screen is divided into two portions in block 200 in some application specific way. The divided input and output areas are adjustable according to used application. This may be a user-adjustable feature so that the display size remains constant and the two screens may vary in size in relation to each other according to users commands. This kind of function is known from computer displays. According to the present invention the area can also be adjusted application specific so that a keypad-part or so called input part of the display allocates as small a display area as possible leaving maximum area of the display for the output part. This is advantageous when a user wants to use the display mainly for performing data, for example when reading sms-messages (short message service) or browsing data fetched from the Internet. On the other hand the user may maximize the keypad or input area by minimizing the output area to be totally invisible, when only effective use of the input area is needed. In application specific, adjusting the area needed for the input part mainly depends on the number of symbols or keys on a specific keypad, which can be for example numeric, alphanumeric or include only characters, function keys or all the mentioned. The actual number of keys that can be displayed at a time depends also on the resolution of the display. The individual symbols need to be visually distinguishable, before the user can select the input.

Next in block 201 it is checked whether the input area of the display is touched. The touch sensitive panel can inform the processor of an input or the processor can detect inputs for example periodically. It also depends on the type of the touch screen, how the detection of the touches is done in detail. Firstly a touch screen panel can be resistive, so it is coated with thin, metallic, electrically conductive and resistive layer. In a resistive touch screen the touch is sensed as a change in electric current. Secondly a touch screen panel can be implemented with ultrasonic waves passing over the touch screen panel. When the panel is touched, portion of the wave is absorbed. So the change in an ultrasonic wave registers a position of a touch event. The third possible touch screen panel type is capacitive, which is coated with a material that stores electrical charges. In this solution the circuits are located in each corner of the panel. When touched, a small amount of a charge is drawn to the point of the contact. The type of the touch screen panel also affects to the means used for activating symbols on a display. Typically it is advantageous to use a finger, because it is easy to use. Additionally the device can contain some pointing means, such as a pen, for a fine adjustment.

If no touch or input event is detected in block 201, the detection is searched again or waited for. The block 201 also includes the discrimination of different functions. In this embodiment the discriminating operation depends on a current mode of a device. If the touch is detected in block 201, the current mode of the display is examined. If the display view is not zoomed in block 202, the zooming is done according to a block 203. The zooming is implemented so that the activated touched portion of the displayed keyboard is magnified and the rest of the keyboard is not seen at all. The magnified area is the area touched by a user and a certain area surrounding it. In this magnified area the keys and symbols are distinguishable and a user can easily determine and select a key or a symbol. If the display view is already zoomed in block 202, the operation continues according to the block 204.

In this embodiment the activated symbol is highlighted in block 205 according to the second detected touch in block 204. The highlighted touch point can be changed by sliding touch means on the display. After the zooming, the input symbol can be selected for example by releasing the touching point. When the touch point is released, the highlighted symbol is displayed or if the highlighted key was a function key, the function is executed. After this the displayed view can either stay in a zoomed mode or return back to a small, all viewing mode. Correspondingly the operation continues from the step 204 or from the step 201.

The above is only one embodiment of the present invention and many modifications may be made in the scope of the invention. According to one embodiment of the present invention after the touch is detected in the step 201, the discriminator (102 in FIG. 1) imparts a zooming event from for example a sizing of windows, such as adjusting the size of an input or an output portion of the touch sensitive display. Typically window sizing and panning events are indicated by sliding a tactile input mean on the display. The zooming can then be identified from the stable, non-moving touch or from round moving touch. Basically this can be implemented by detecting two sequential positions of a touch and checking, if there is a difference between the places. According to the above described embodiment accompanied by the FIG. 2, the zooming always takes place before the selection of the input. In this embodiment the mode of a display is checked: if zooming is not done, it is implemented in step 203, after the zooming is done, the detected touch indicates the selected input. It should be noted that the zooming can be done more than once. If the first view is for example the whole typewriting keyboard, for example for editing an sins-message, the zooming can be advantageously done two or three times in order to get a view of visually distinguishable, recognisable keys. On the other hand the input of numbers from the numeric keypad can be done faster, if the zooming is done only once. According to one advantageous embodiment a user has an opportunity to choose the input key or symbol without any zooming or magnification. A user can use some auxiliary means, such as a pen or stylus, to point out a small key. The magnification may be implemented in sequential steps or it can be done stepless until a continuous touch sustains. The stepless magnification may be implemented so that there actually are very small magnification steps and those are produced and presented sequentially fast enough for user to get an impression of continuous presentation.

Further one affecting feature is the dimension of the magnification. The dimension or magnification rate is typically predetermined and it may be a keypad specific feature, specified by an application or a mode, or the dimension can be determinable by a user. A display with numbers of small keys and details must be magnified so much, that the using is comfortable. Also it must be kept in mind that if the magnification is multiplex or the original keypad has less and larger keys, a multiple magnification may cause only one or few keys to be visible on the screen. This is not usually convenient for the user, because the magnified area can be mis-selected, after which the correction is easier and faster to do, if also the adjacent keys are visible.

Typically the present invention is implemented so that portions of the original keyboard can be viewed in magnified mode just by sliding a finger or other touch means to a side edge of the viewed keyboard portion. Touching to the side of the viewed keypad makes the view scroll. This is most advantageous for users, who are familiar with the original keypad, so they will know what keys will come up next, beside the viewed ones. The users unfamiliar with used keypads can either scroll around on a keypad and find the symbol they are looking for, or alternatively go back to a non-zoomed mode and start the zooming again on a selected area.

The touched symbol or key is highlighted in a block 205 as a visual sign of a selected key to a user. In a block 206 the actual selection of a key, such as a letter or a number, or activation of a function or a soft key can be indicated in few ways. The typical way is to release the touch, when the wanted key is highlighted. Another possible way to select and activate the wanted key is to keep the touch fixed in one place on a selected key a predetermined time, for example a few seconds. Also according to an advantageous embodiment if the sensed pressure on the screen exceeds some limit value, the key is activated. It is obvious to a person skilled in the art, that there are many ways to implement the present invention.

Figure 3A:
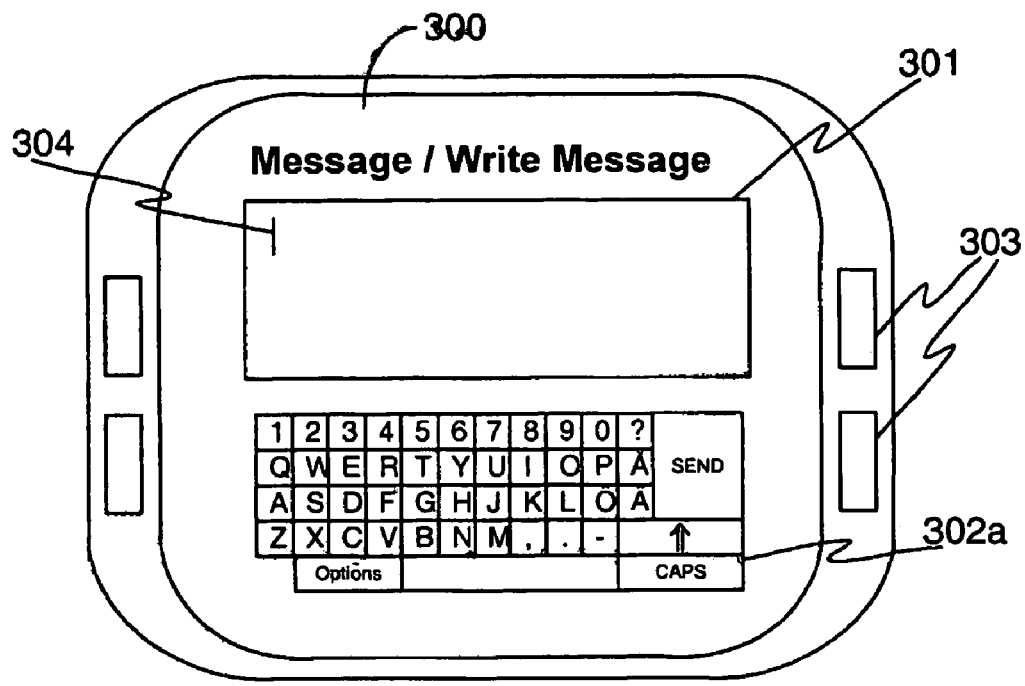
FIGS. 3a-3c illustrate a method according to an advantageous embodiment of the present invention.
Figure 3B:
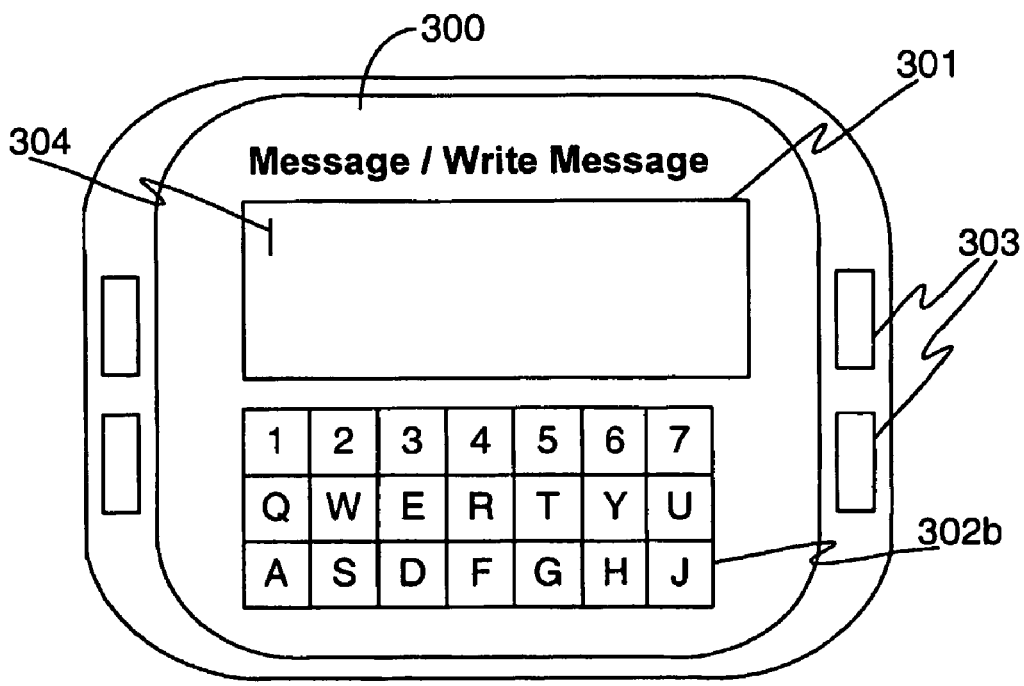
Figure 3C:
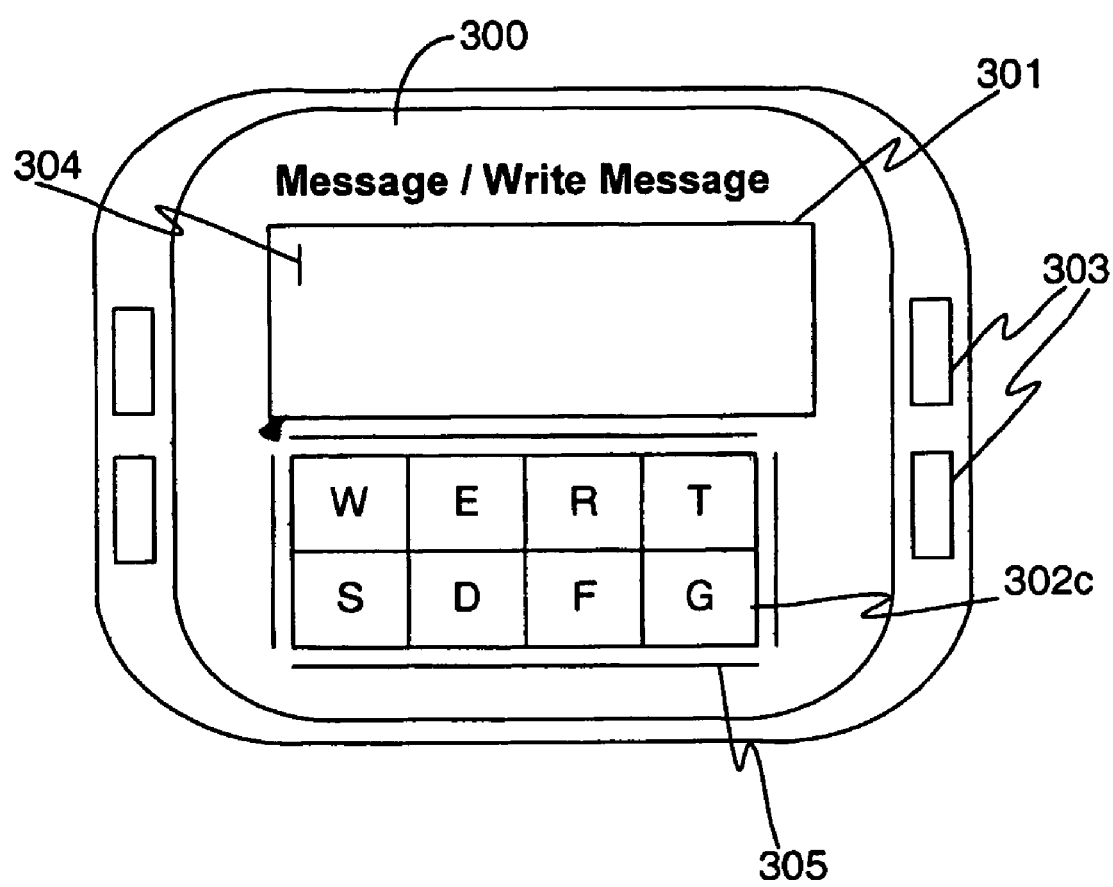

FIGS. 3a-3c show one method according an advantageous embodiment of the present invention. The mobile device is in an sms-message writing mode and the input 302abc and output 301 portions are advantageously adjusted by the mode. The display 300 in FIG. 3a can be a typical phone device or for example a small wrist-mountable device. In the display 300 there is an output portion 301, which has a cursor 304 showing the current place for input. Below the output portion 301 there is an input or a keyboard portion 302a. This input portion 302a is a simulated keyboard viewed on a display 300.

Buttons or keys 303 are soft or dedicated keys. Typically dedicated keys are used to implement some often used functions, such as call or cancel. There can also be soft keys for different, changing functions. The functions will change according to the view or mode of the display so, that the alternative corresponding to a specific button is represented adjacent to it on a display view. This makes the use of changing, mode specific alternatives easy and fast.

Now the user wants to produce an sms-message, in particular the user wants to input a letter D. The viewed keyboard is arranged in the same order as an original typewriter keyboard. Many users are familiar with these typical keyboards from computers and laptops, so a typical user knows in some accuracy where the wanted letter 'D' is situated in the keyboard. The user points roughly to the area that the wanted letter is situated. The touch point of a user in FIG. 3a is situated on the letter 'D'.

In FIG. 3b the detected touch point of the keyboard is zoomed as shown in keyboard portion 302b. The selection can advantageously be done just by putting a finger, or some pointing mean, on a touch screen. The user can set up the speed of zooming, which advantageously is set from a few milliseconds to a few seconds. While zooming the keyboard, a user can define his search by moving a pointer on the touch screen panel. A chosen key is for example highlighted to give the user a visual feedback of a current, active selection. A key can be selected to be the input by releasing the touch off the touch screen, when the specific key is selected. Otherwise the pointer is positioned again roughly on the area to be zoomed, in this embodiment the area surrounding the letter 'D'.

FIG. 3c illustrates the touch screen 302c after the keyboard is magnified or zoomed for a second time. The keys are now advantageously at the minimum the size of 7×7 millimeters, which corresponds to the average size of a finger tip. There are also edges 305 rounding the keyboard. Because only few keys are seen, the user can scroll the keyboard by moving a pointer to the selected side on the edge. Now the letter 'D' is selected by lifting the pointer off from it, when it is highlighted. The letter 'D' is then inputted to the display portion 301 above. After the input, the magnified, zoomed keyboard 302c can be used in magnified mode or returned to original mode, in which the whole keyboard can be seen, as illustrated in FIG. 3a.

The invention claimed is:

1. A method for operating a mobile device having a touch sensitive display, the method comprising:
   dividing the touch sensitive display into an adjustable input portion and an adjustable output portion, areas of the adjustable input and output portions being adjustable with respect to each other,
   displaying a plurality of keys within the adjustable input portion of the touch sensitive display,
   detecting a location of a first tactile input on the adjustable input portion of the touch sensitive display displaying a plurality of keys,
   zooming a view of the adjustable input portion by displaying and linearly magnifying an area within which the first tactile input was detected,
   detecting a location of a second tactile input after magnifying said area,
   highlighting a key on the location of the second detected tactile input, and
   activating the highlighted key and identifying the activated key as an input.

2. A method according to claim 1, wherein the divided adjustable input and output portions in the touch sensitive display are adjusted application specific.

3. A method according to claim 1, wherein the divided adjustable input and output portions in the touch sensitive display are user adjustable.

4. A method according to claim 1, wherein the detecting the location of the first tactile input includes discriminating whether the first tactile input was intended to control a function or a mode of the device or to select a key displayed within the adjustable input portion of the touch sensitive display.

5. A method according to claim 1, wherein the zooming step magnifies the area within which the first tactile input was detected and its surroundings in the touch sensitive display by a predetermined rate.

6. A method according to claim 5, wherein the magnification rate is specified by an application.

7. A method according to claim 5, wherein the magnification rate is determined by a user.

8. A method according to claim 1, wherein in the zooming, the area within which the first tactile input was detected and its surroundings are magnified and a view shown by the rest of the adjustable input portion is hid.

9. A method according to claim 1, wherein as a response to a persisting tactile input within the adjustable input portion of the touch sensitive display the zooming is performed a plurality of times.

10. A method according to claim 9, wherein in the zooming, the magnification is implemented in sequential steps.

11. A method according to claim 9, wherein in the zooming, the magnification is implemented stepless as a response to a persisting tactile input.

12. A method according to claim 1, wherein the activating is performed as a response to the tactile input being released.

13. A method according to claim 1, wherein at least one of the location detection actions of the first and the second tactile input and the activating is performed as a response to a situation in which a tactile input has been fixed for a predetermined period of time.

14. A method according to claim 1, wherein after the activating is performed, the display view is displayed in a zoomed mode or returned back to an original mode depending on application specific determinations.

15. A method according to claim 1, wherein after the activating is performed, the display view is displayed in a zoomed mode or returned back to an original mode depending on user specific determinations.

16. An apparatus comprising:
a touch sensitive display capable for being divided into an adjustable input portion and into an adjustable output portion, areas of the adjustable input and output portions being adjustable with respect to each other and the adjustable input portion being adapted to display a plurality of keys and to detect a tactile input,
a zooming circuit for zooming a view of the adjustable input portion for displaying and linearly magnifying an area surrounding a location of a first detected tactile input,
a highlighting circuit for highlighting a key on a location of a second detected tactile input, and
an activating circuit for activating the highlighted key and identifying the activated key as an input.

17. An apparatus according to claim 16, comprising means for adjusting the adjustable input and output portions application specific.

18. An apparatus according to claim 16, wherein the adjustable input and output portions are user-adjustable.

19. An apparatus according to claim 16, comprising a processor coupled to the touch sensitive display for detecting a tactile input.

20. An apparatus according to claim 16, comprising means for discriminating a type of a tactile input.

21. An apparatus according to claim 20, comprising a processor for comparing the differences in times and locations of the first and the second detected tactile inputs for discriminating the type of at least one of the following: the first tactile input and the second tactile input.

22. An apparatus according to claim 16, comprising means for linearly magnifying the area surrounding the location of the first detected tactile input and for hiding a view shown by the rest of the adjustable input portion.

23. An apparatus according to claim 22, comprising means for specifying a rate of the magnification by an application.

24. An apparatus according to claim 22, comprising means for determining a rate of the magnification by a user.

25. An apparatus according to claim 22, comprising means for magnifying the area surrounding the location of the first detected tactile input in sequential steps.

26. An apparatus according to claim 22, comprising means for magnifying the area surrounding the location of the first detected tactile input in a stepless manner as a response to a persisting tactile input.

27. An apparatus according to claim 16, comprising means for displaying a symbol or executing a function as a response to an activating tactile input.

28. An apparatus according to claim 16, comprising means for scrolling the viewed adjustable input portion of the touch sensitive display for changing the viewed area of the adjustable input portion of the touch sensitive display.

29. An apparatus according to claim 16, wherein the apparatus is a mobile device.

30. An apparatus having a touch sensitive display, the apparatus including:
means for dividing the touch sensitive display into an adjustable input portion and into an adjustable output portion, areas of the adjustable input and output portions being adjustable with respect to each other,
means for detecting a first tactile input on the adjustable input portion,
means for zooming a view of the adjustable input portion for displaying and linearly magnifying an area surrounding a location of the first detected tactile input,
means for highlighting a key on a location of a second detected tactile input, and
means for activating the highlighted key and identifying the activated key as an input.

31. A readable medium having a program code stored thereon for execution by a processor for operating a mobile device having a touch sensitive display, the program code when executed by said processor:
dividing the touch sensitive display into an adjustable input portion and an adjustable output portion, areas of the adjustable input and output portions being adjustable with respect to each other,
displaying a plurality of keys within the adjustable input portion of the touch sensitive display,
detecting a location of a first tactile input on the adjustable input portion of the touch sensitive display displaying a plurality of keys,
zooming a view of the adjustable input portion by displaying and linearly magnifying an area within which the first tactile input was detected,
detecting a location of a second tactile input after magnifying said area,
highlighting a key on the location of the second detected tactile input, and
activating the highlighted key and identifying the activated key as an input.

* * * * *